Aug. 12, 1924.

C. RENO 1,504,974

SYSTEM FOR TRANSMITTING ENERGY WITHOUT WIRES

Filed March 1, 1920   6 Sheets-Sheet 1

INVENTOR
Conrad Reno.

Aug. 12, 1924.
C. RENO
1,504,974
SYSTEM FOR TRANSMITTING ENERGY WITHOUT WIRES
Filed March 1, 1920
6 Sheets-Sheet 4

INVENTOR
Conrad Reno.

INVENTOR
Conrad Reno

Aug. 12, 1924.

C. RENO 1,504,974

SYSTEM FOR TRANSMITTING ENERGY WITHOUT WIRES

Filed March 1, 1920    6 Sheets-Sheet 6

INVENTOR
Conrad Reno

Patented Aug. 12, 1924.

1,504,974

UNITED STATES PATENT OFFICE.

CONRAD RENO, OF SPRINGFIELD, MASSACHUSETTS.

SYSTEM FOR TRANSMITTING ENERGY WITHOUT WIRES.

Application filed March 1, 1920. Serial No. 362,283.

*To all whom it may concern:*

Be it known that I, CONRAD RENO, a citizen of the United States, residing at Springfield, in the county of Hampden and Commonwealth of Massachusetts, have invented an Improved System for Transmitting Energy Without Wires, of which the following is a specification.

My invention relates chiefly to a new method of, and apparatus for, transmitting electromagnetic energy in a confined path in any desired direction through the air, the water and other non-metallic substances, without the directive aid, or agency, of connecting wires or metallic conductors of any kind.

The main object of my invention is the directive wireless transmission of energy. I attain this object by causing the energy to flow in the concentrated form of a stream or current, which can be transmitted in any desired direction along a wireless-and-metallic circuit, or system of circuits, which connect the transmitting apparatus with the utilizing apparatus. The energy is localized within the narrow confines of the wireless-and-metallic circuit, or system of circuits, like water flowing through a pipe, and does not spread out over a wide wave-front. The energy flows in stream-like form in contradistinction to the usual spreading wave-like form of the wireless flow of energy. My method of wireless transmission of energy may be described as the "stream method," to distinguish it from the usual wave method of wireless transmission of energy.

Another object of my invention is to gather and receive energy transmitted by wireless means, and to pass the energy on by metallic conductors to suitable utilizing apparatus, such as relays, controllers, amplifiers, retransmitting apparatus, motors, lamps, and the like. This object is attained by the aid and agency of a new form of receiving antenna, described herein, which may be placed in operative relation with a beam or cable, or system of wireless conductors and with the metallic conductors of the utilizing apparatus, so as to establish a complete wireless-and-metallic circuit for each phase of alternating current, when such current is supplied to the beam or cable, or system of wireless conductors; and also to establish a complete wireless-and-metallic circuit for direct current, when direct current is supplied to the beam or cable, or system of wireless conductors.

The wireless-and-metallic circuit, or system of circuits, may be established entirely in the air, or partly in the air and partly in water or in the earth. Both-way sets of wireless conductors, for transmitting energy both out to the utilizing apparatus and back to the transmitting apparatus, may be located in the beam; or a one-way set of wireless conductors may be located in the beam, and the other-way set may be located outside of the beam.

Each wireless-and-metallic circuit is a divided circuit with many branches or divisions beginning at the transmitter-generator and ending at the utilizing apparatus. A divided circuit is known to reduce the total resistance, impedance and reluctance. Other devices and means for reducing the resistance, impedance and reluctance will be stated later.

When electrical connection is made by two sets of wireless conductors, wherever located, with the metallic conductors of the transmitter-generator at one end of the line and with the metallic conductors of the relay or other form of utilizing apparatus at the other end of the line, a complete wireless-and-metallic circuit will be established, capable of transmitting energy in the form of a stream.

Other objects and advantages will appear in the following description and in the accompanying drawings, in which:

Fig. 6ª shows a method of producing a beam of wireless conductors through heating the cathodes by induction currents;

In carrying out my methods of transmitting, receiving, and utilizing energy, I may, of course, employ various forms of apparatus and devices. In order to illustrate my method, I have shown two main types of apparatus, namely, the X-ray type and the Z-ray or ultra X-ray type.

The X-ray type of apparatus generates a beam of X-rays, and what I term X-ray wireless conductors, by the means described later. The Z-ray type of apparatus generates a beam of ultra X-rays, which I term Z-rays, and also a beam of Z-ray wireless conductors. Another type of apparatus is the ultra-violet-ray type, which generates a beam of ultra-violet rays and ultra-violet-ray wireless conductors.

The X-ray, Z-ray and ultra-violet-ray types of apparatus may each be divided and subdivided into varieties and modifications, some of which are described herein under the descriptive titles of "dynamo", "transformer", "solenoid", "closed spiral core", "magnetic amplifier", and "spirally revolving magnetic field" apparatus and devices. Also many different combinations of these types, varieties and modifications may be employed to fit the exigencies of particular cases, in the practice of the stream method of transmitting energy without wires.

In the operation of the X-ray and ultra-violet-ray devices, a stream of electrons is pumped through the wireless-and-metallic circuit to the relay or other type of utilizing apparatus at high pressure, and flows back to the transmitter-generator at low pressure, when these pieces of apparatus are properly connected into the wireless-and-metallic circuit. In the operation of the Z-ray device, a stream of electromagnetons is pumped through the wireless-and-metallic circuit, including the windings of the relay or other type of utilizing apparatus, at high pressure, and flows back to the transmitter-generator at low pressure. This operation is repeated over and over again whenever these pieces of apparatus are properly connected into the wireless-and-metallic circuit.

Figure 1:
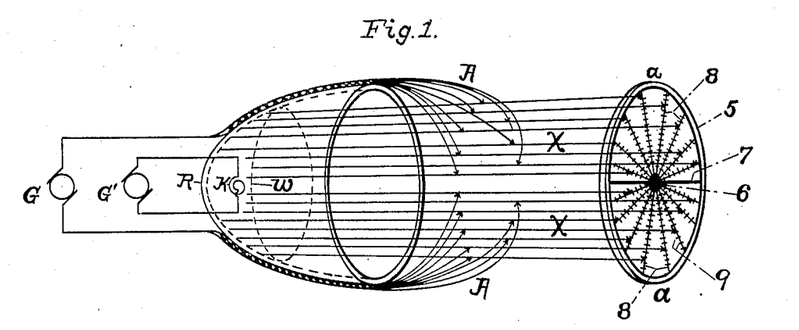
Fig. 1 is a diagrammatical view illustrative of the X-ray type of transmitter-generator,—designed for the use of either direct current or single phase alternating current.

Referring to Fig. 1: the X-ray type of transmitter generator, designed for the use of either direct current, or single phase alternating current, will be described. A A are a pair of transmitting antennæ, which connect with the pair of X-ray wireless conductors marked X X, which in turn connect with the pair of receiving antennæ marked a a.

R is a parabolic reflector; K is a spiral coil of tungsten wire or filament, located at the focus of said reflector R; G' is a generator connected with the spiral coil of tungsten, employed to heat the tungsten to incandescence, thus forming a prolific source of electrons, which are violently discharged against the interior walls of the reflector R, and generate the pair of X-ray wireless conductors marked X X; w is a "window" or thin partition wall in the reflector R and forms with the latter a chamber which is partially air-exhausted; G is a generator supplying current to the wireless-and-metallic circuit through the pair of transmitting antennæ marked A A.

The receiving antenna shown in Fig. 1 consists of two segments, a a, insulated from each other and from the ground, forming a pair of segments. This pair of segments is adjusted across the pair of wireless conductors as shown in Fig. 1, in such a manner that the outgoing current will flow through one segment and the incoming current will flow through the other segment of the pair.

The particular antenna shown in Fig. 1 includes a circular band 5, a central hub 6, and a diametrical bar 7, which connects the hub and band; all the elements 5, 6 and 7 being of insulating material. From the hub 6 there radiate a series of metallic rods 8, each of which has a series of strips or cross-pieces 9 of tin foil, copper or the like, which connect with the wireless conductors X, and gather the current flowing in the wireless-and-metallic circuits. These rods 8 above the bar 7 constitute one of the segments of the antenna, and the rods 8 below the bar 7 constitute the other segment of the pair of segments referred to above.

Figure 2:
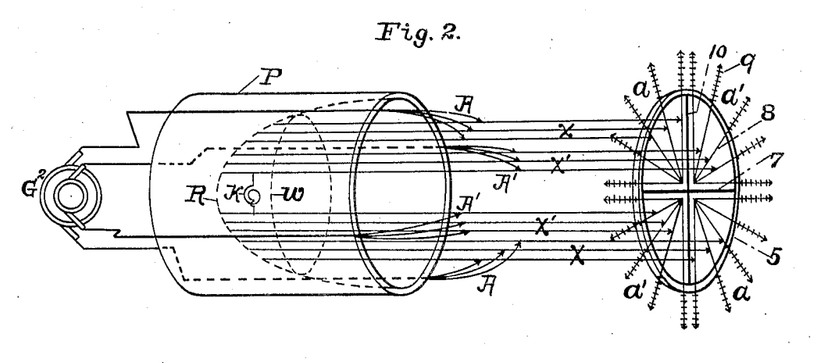
Fig. 2 is a diagrammatical view illustrative of a transmitter-generator of the X-ray type designed for the use of two-phase alternating current.

Referring to Fig. 2, wherein is shown a transmitter-generator designed for the use of two-phase alternating current, the metallic conductors from the two-phase generator G² extend to the parabolic reflector R, as above explained, and terminate each with a series of transmitting antennæ. The metallic conductors A for phase 1 current are, of course, located diametrically opposite each other, and so also are the metallic conductors A' for phase 2; the conductors for phase 2 being disposed at right angles to those for phase 1. In this instance, the reflector R is shown as located within sleeve P. The receiving antenna, as before, includes a circular ring 5 divided diametrically by a bar 7, and in addition again divided by a second bar 10 at right angles to bar 7; all such elements being of insulating material. The rods 8 are substantially the same as described above except that they extend beyond the periphery of ring 5. The bars 7 and 10 divide the antenna into four segments arranged in pairs $a, a$ and $a', a'$.

The transmitting antennæ A, A are supplied with phase 1 current, and the transmitting antennæ A', A' are supplied with phase 2 current. A beam of two pairs of X-ray wireless conductors is projected from the parabolic reflector R, and these wireless conductors X, X' connect both with the transmitting antennæ A, A' and with the receiving antennæ $a, a'$, thus forming complete wireless-and-metallic circuits. The wireless-and-metallic circuit which carries phase 1 current is indicated by the letters A X $a$ X A, and the wireless-and-metallic circuit which carries phase 2 current is indicated by the letters A' X' $a'$ X' A'. These two-phase currents are then led to motors, incandescent lamps, or other types of utilizing apparatus, as shown in Fig. 3.

Figure 3:
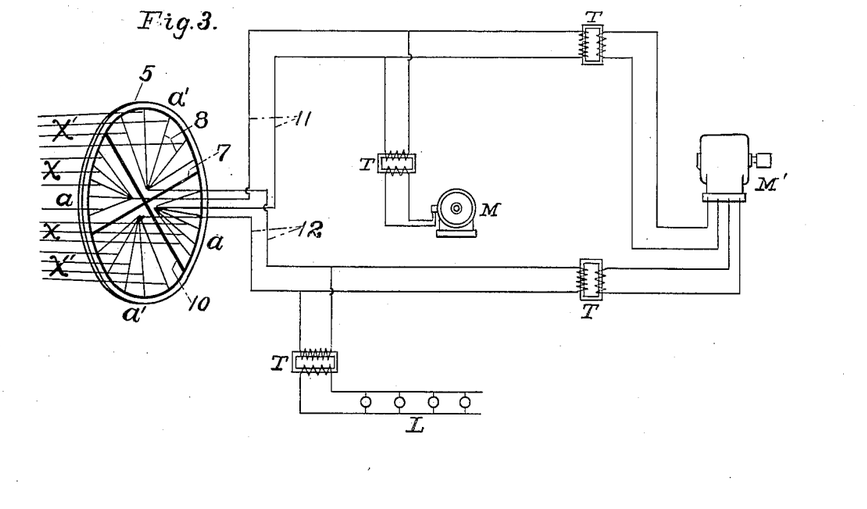
Fig. 3 is a diagrammatical view of a receiving and utilizing apparatus for use with the transmitter-generator shown in Fig. 2.

In Fig. 3 I have shown how a receiving antenna, such as that shown in Fig. 2, for example, may be connected to various types of utilizing apparatus. Thus, the rods 8 of the segments $a, a$ are connected to metallic conductors 11, and the rods 8 of the segments $a', a'$ are connected to metallic conductors 12. The wires 11 carry phase 1 current, and the wires 12 carry phase 2 current. When a high voltage generator is used, as is often advisable, step-down transformers marked T may be employed for one phase or for both or all phases. M is a single-phase motor; M' is a two-phase motor, and L is a string of lamps.

A feature of my invention is to construct and maintain wireless-and-metallic circuits between the transmitting apparatus and the apparatus for utilizing the energy. My so-called wireless conductors connect the metallic conductors of the transmitting antenna with the metallic conductors of the receiving antenna, and the latter conductors are connected with the metallic conductors of the utilizing apparatus, thus forming one or more complete wireless-and-metallic circuits through which the energy flows in a confined path or narrow channel in any desired direction.

Another feature of my invention is to produce a beam of X-rays, which rays are known to construct lines of conductivity in the air, the water, and in other substances through which the rays pass. X-rays constitute one species of my wireless conductors. X-rays are known to be produced by the sudden stoppage of swiftly moving electrons; and it is also known that when tungsten (among other metals) is heated to incandescence, a copious supply of electrons will be liberated therefrom and discharged at high speed; that when a moving electron is brought to a sudden stop by impact with a hard substance, it gives rise to an X-ray, which is reflected from the surface of the reflector at the same angle at which the moving electron strikes that surface, the angle of reflection being equal to the angle of incidence, as in the case of light. Upon these familiar principles I produce a beam of X-rays by placing a source of electrons, such as an electrically heated tunsten-wire spiral, at the focus of a parabolic reflector. X-rays are further known to travel in straight lines, and to penetrate water a considerable distance, and to penetrate air a greater distance, and to act upon the photographic plate, and to take "shadow pictures."

Another feature of my invention is to produce a beam of Z-rays or ultra X-rays, which constitute a second species of my wireless conductors. Z-rays are ultra X-rays, and are produced by the sudden stoppage of swiftly moving electromagnetons, or electromagnetic units, composed of electrons "saturated" with magnetic energy, as explained more fully elsewhere. A beam of Z-rays is produced by superposing a moving magnetic field, preferably a spirally revolving magnetic field, upon the streams of electrons discharged from a hot cathode at the focus of a parabolic reflector. Since electromagnetons possess higher kinetic energy than an equal number of electrons moving at equal velocity, it follows that the Z-rays generated by the sudden stoppage of swiftly moving electromagnetons will be endowed with greater penetrating power than the X-rays generated by the sudden stoppage of electrons moving at the same speed, and the beam of wireless conductors which is generated by the Z-ray beam will extend to a greater distance from the transmitter-generator than will the beam of wireless conductors which is generated by the beam of X-rays. Another advantage of superposing the spirally revolving magnetic field upon the electrons discharged from a hot cathode at the focus of the parabolic reflector is that the electromagnetons are more advantageously distributed over the inner surface of the parabolic reflector, so that the rays produced by their sudden stoppage will form a denser and more symmetrical beam of rays, whereby a denser and more symmetrical beam of wireless conductors will be constructed in the desired portion of space.

Figure 6:
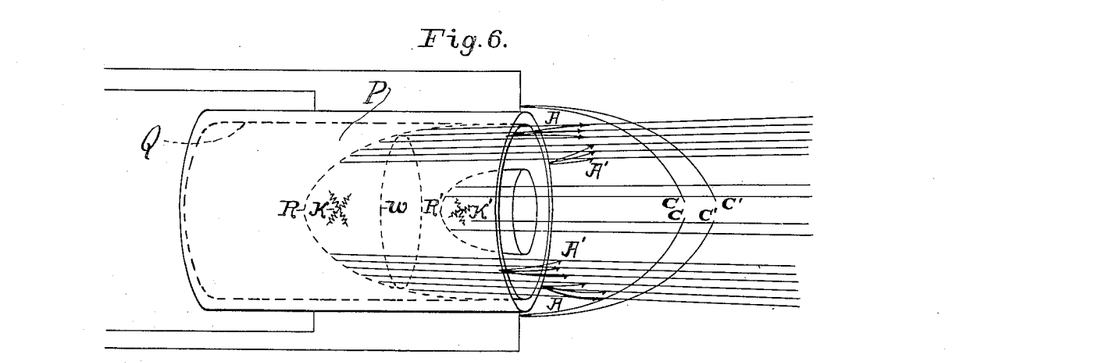
Fig. 6 is a diagrammatical view combining the members separately shown in Figs. 4 and 5.
Figure 6A:
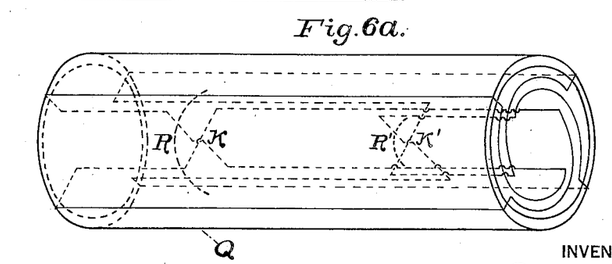

The density of the beam of wireless conductors depends upon the number of electrons discharged from the hot cathode. When a very dense beam is desired, it may be produced by employing the method of two cathodes heated by polyphase currents, as shown in Fig. 6ª, and explained elsewhere herein.

Another advantage of the Z-ray method of producing a beam of wireless conductors is that the superposed moving magnetic field renders it unnecessary to employ a high vacuum, or to exhaust the air at all, in the chamber or barrel containing the source of the electron streams. A rotating magnetic field may be used for this purpose, but I prefer to use the spirally revolving magnetic field, for the reasons stated.

The electromotive force generated in a circuit by means of the spirally revolving magnetic field is distributed over a space of three dimensions, whereas the electromotive force generated by the rotating magnetic field is distributed over a space of only two dimensions.

The feature of generating distributed electromotive force by the use of the spirally revolving magnetic field is obviously applicable generally to all kinds of conductors, whether wireless or metallic.

Various forms of antenna are shown in the drawings, and may be used either with the X-ray type or with the Z-ray type of transmitting and utilizing apparatus.

The transmitting antenna consists preferably of copper wires extending beyond the open end (or ends) of the transmitter-generator, toward the wireless conductors and intercepting or connecting with the wireless conductors, as indicated in Figures 1, 2, 6, 9, and 11.

Figure 8:
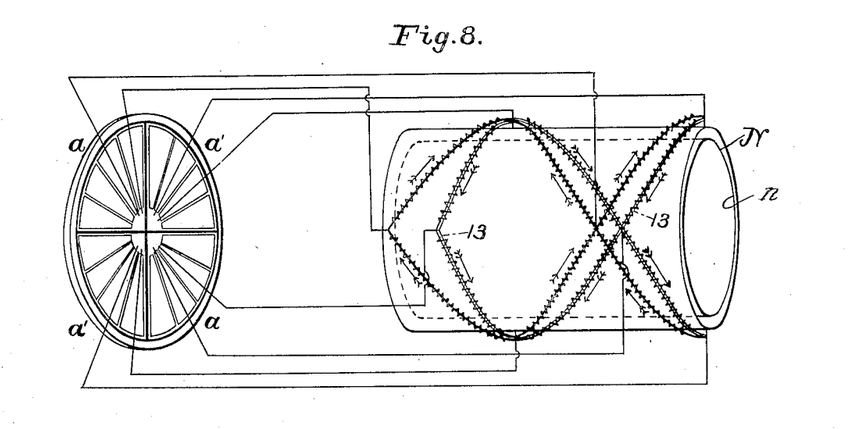
Fig. 8 is a diagrammatic view of the closed spiral iron-core variety of apparatus, wound for four-phase current, which may be used as the primary for a transmitter-generator, or as the primary for a relay, or re-transmitter-generator. The four phase primary windings are connected to one form of my receiving antenna.
Figure 12:
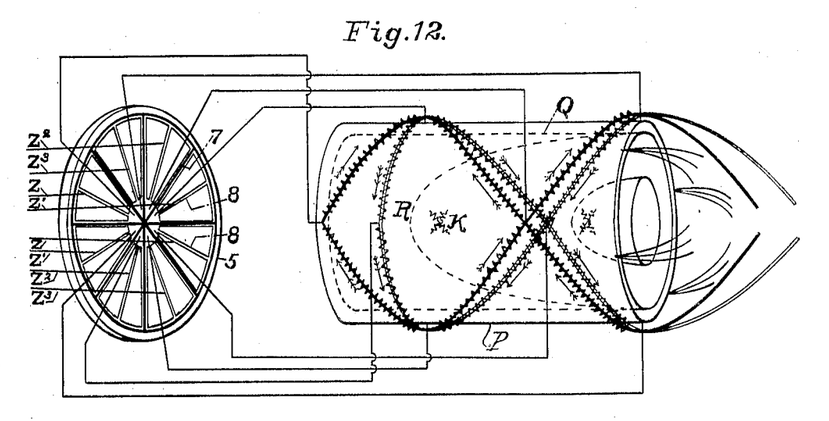
Fig. 12 is a diagrammatical view of a re-transmitter-generator designed to receive the energy from one receiving antenna and relay it to another receiving antenna.

The receiving antenna consists preferably of a wheel-like structure divided into one pair of segments, $a\ a$, or into two pairs of segments, $a\ a$ and $a'\ a'$, or into three (or more) pairs of segments. Each segment consists of metallic conductors and is insulated from all other segments, and each pair of segments is preferably so arranged and placed across the beam of wireless conductors as to receive a particular phase of current, when the current is alternating current, and, when direct current is used, each pair of segments is so adjusted as to receive and pass the outgoing current through one segment and the incoming or return current through the other segment of each pair of segments. When two-phase current is used, I prefer two pairs of segments, $a\ a$ and $a'\ a'$, as shown in Figures 2 and 8. When four-phase current is used, four pairs of segments may be employed, as indicated in Fig. 12, or two pairs may be employed, as indicated in Fig. 8. When three-phase current is used I prefer to employ three pairs of segments, each pair being so adjusted and placed across the beam of rays as to receive and to permit to pass through a particular phase of current. In the preferred case the short axis of the antenna should coincide as near as may be feasible with the long or major axis of the beam of rays. The metallic conductors of each pair of segments are connected with the metallic conductors or windings of the utilizing apparatus, such as motors, electric lights, etc., as shown in Figures 3, 8 and 12.

When direct current is supplied to my beam of wireless conductors, a section consisting of one-half of the wireless conductors will carry outgoing current to the receiving and utilizing apparatus, and the other section of the wireless conductors will carry the return or incoming current back to the transmitter-generator. For direct current, the receiving antenna consists preferably of two equal-sized segments forming a pair of segments, adjusted at right angles to the beam of wireless conductors, so that one segment will receive the outgoing current and the other segment will receive the return or incoming current.

When single-phase alternating current is supplied to my system of wireless conductors, one-half of such conductors will carry the outgoing current and the other half will carry the incoming or return current. Of course, when the alternating current changes direction, the half of the wireless conductors which previously carried the outgoing current will now carry the return or incoming current, and vice versa. The receiving antenna for single-phase current, as well as for direct current, consists preferably of one pair of segments whose centers are displaced from each other one hundred and eighty degrees in a circular antenna, which is placed across the system so that its short axis will coincide approximately with the major axis of the system.

When polyphase current is supplied to my system of wireless conductors, the various phases are supplied at different transverse points or sections of the system, corresponding to the number of phases supplied. Thus when two-phase current is supplied to the system, it is supplied to four sections of the system whose centers are displaced ninety degrees from each other.

The receiving antenna consists preferably of two pairs of segments, the centers of each pair being one hundred and eighty degrees removed from each other, when two-phase current is used.

When three-phase current is supplied to my system of wireless conductors, it is supplied to sections of the system whose centers are displaced by sixty degrees, thus dividing the system into three pairs of sections, corresponding to the three pairs of segments of the receiving antenna. That is to say phase 1 current is supplied to one pair of sections of the system and flows back and forth through said pair of sections and through one pair of segments in the receiving antenna, which segments are so arranged and adjusted as to receive this particular phase of current. Phase 2 current is supplied to a second pair of sections and flows back and forth through this second pair of sections, and back and forth through a second pair of segments in the receiving antenna, said segments being so arranged and adjusted as to receive this particular phase of current. Phase 3 current is supplied to a third pair of sections and flows back and forth through this third pair of sections, and back and forth through a third pair of segments in the receiving antenna, said pair of segments being so arranged and adjusted as to receive this particular phase of current. Metallic conductors are employed to carry the three-phase current from the receiving antenna to the three-phase motor and other apparatus designed for three-phase current.

This method of transmitting polyphase currents consists in providing a system or cable, of wireless-and-metallic circuits, and supplying to said system or cable at different transverse sections the various phases of alternating current, and providing at the receiving station an antenna divided into a suitable number of relatively insulated segments, each pair of segments being so adjusted and arranged as to receive a particular phase of the current and to pass it on to utilizing apparatus by metallic conductors connected therewith.

In more general terms the stream method of transmitting energy consists in establishing a wireless-and-metallic circuit between the transmitting apparatus and the utilizing apparatus and in applying electromotive force across said circuit to produce a stream of electrons (electric energy), or in superposing a moving magnetic field, preferably a spirally revolving magnetic field, upon said circuit, thereby producing a stream of electromagnetons (electromagnetic energy).

A leading feature of my Z-ray method of directive wireless transmission of energy is the production of a spirally revolving magnetic field by means of polyphase alternating currents having phase displacements equal to the spiral displacements in position of the various windings or coils. To produce such a spirally revolving magnetic field I may use two or more iron cores arranged in spirals and preferably doubled back upon themselves so as to interlink and cross each other and themselves at angles equal to the phase-angles or phase-differences of the currents used in producing the spirally moving magnetic field. Thus when the currents have phase-differences of ninety degrees, the iron cores interlink and cross each other at angles of ninety degrees. When the currents have phase-differences of one hundred and twenty degrees, the iron cores interlink and cross at an angle of one hundred and twenty degrees.

In the solenoid variety of the Z-ray type of my transmitter-generator the ends of these iron cores are carried out beyond the body of the apparatus, so as to surround my beam or system of wireless conductors which connect with the metallic conductors of the secondary apparatus in my transmitter-generator. My wireless conductors are wireless extensions of these metallic conductors. The action of this apparatus is to project a beam or system of wireless conductors in the desired direction, and to connect these wireless conductors with the metallic conductors of both the transmitting and receiving apparatus, and to produce and superpose upon such wireless-and-metallic circuits a spirally revolving magnetic field, whereby electromotive forces are induced and currents produced in such wireless-and-metallic circuits.

The X-ray method of wireless transmission of energy has been described in connection with Figures 1, 2, and 3. Figures 4 to 12, relate to my Z-ray method of wireless transmission, reception and utilization of energy, the preferred method, and will next be described.

Figure 4:
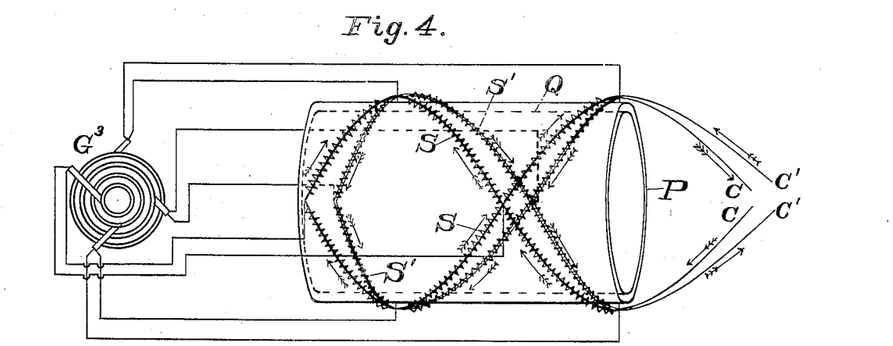
Fig. 4 is a diagrammatical view of the primary of a transmitter-generator of the dynamo type, for use in practicing the Z-ray or ultra X-ray method of wireless transmission of energy.
Figure 7:
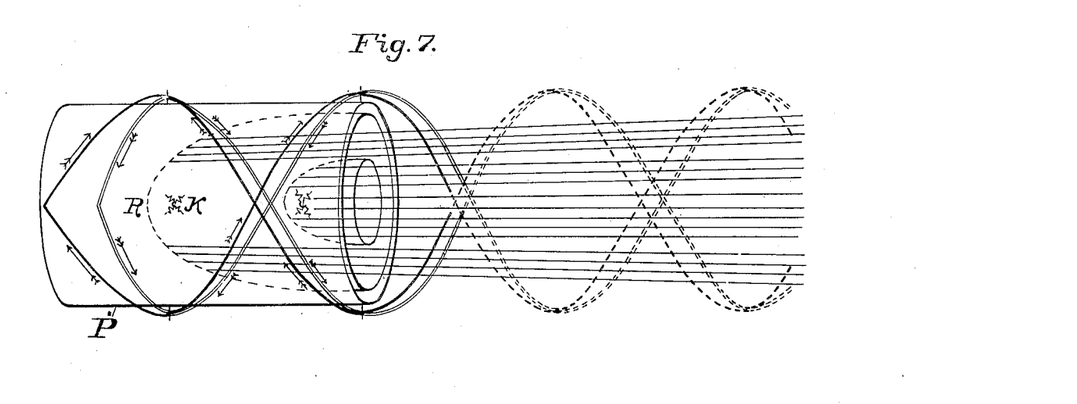
Fig. 7 is a diagrammatical view of a transmitter-generator of the solenoid variety of the Z-ray type and illustrative of the operation.

Fig. 4 represents the dynamo form of primary of the transmitter-generator used with my Z-ray method of wireless transmission of energy. $G^3$ is a four-phase generator supplying four-phase currents to the four windings of the spiral solenoids marked S S and S' S', and C C and C' C' are the iron cores thereof, which intersect each other at right angles. The phase windings are arranged like those of an induction motor. The iron ends C C and C' C' of the solenoids, S S and S' S', are not wound for current, and extend out beyond the cylindrical framework P of the apparatus at the front end. The function of these four-phase windings and currents is to produce four-phase fluxes in time-and-space quadrature with one another, as in the four-phase induction motor; and the currents should be caused to flow in the like relative directions as in the four-phase induction motor. When the iron cores of the solenoids are thus wound and supplied with four-phase currents, spirally shifting magnetic poles will be produced in each solenoid, which poles move in the directions indicated by the arrows in Figures 4, 7 and 8. Moreover, by reason of my arrangement, two streams of spirally moving magnetic fluxes will be projected from the iron ends of the solenoids S S and S' S' into the space surrounding my beam of wireless conductors, and the poles of "polarizations" produced by the combinations of these projected four-phase fluxes will also shift spirally around said beam, as shown in Fig. 7.

Figure 5:
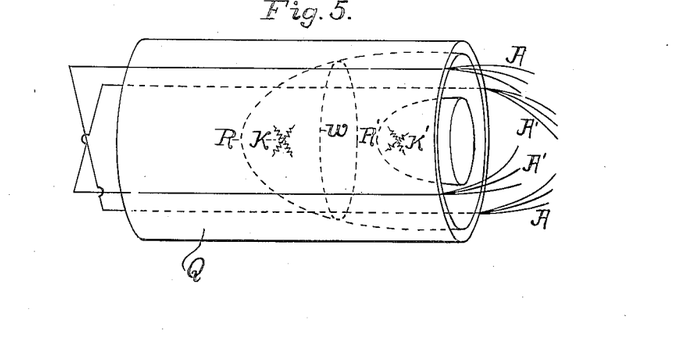
Fig. 5 is a diagrammatical view of the secondary of the same apparatus.

The apparatus just described in Fig. 4 is the primary only of the transmitter-generator, and is used with a secondary Q, such as is separately shown in Fig. 5, the two constituents or members being separately shown for the sake of clearness. The primary and secondary members are shown combined in Fig. 6, although much of the detail has been omitted for the sake of clearness. In Fig. 6 the apparatus is shown in operation, producing a spirally revolving magnetic field, and developing a beam of Z-ray wireless conductors.

I have shown four-phase currents and circuits merely to illustrate my method of and apparatus for producing a spirally revolving magnetic field, and transmitting the energy to a distance from its source. But polyphase currents with any convenient number of phases may be used with a suitable number of electrical circuits, which are spirally displaced in position from each other by a position angle equal to the phase angle of the polyphase currents. In general terms, the apparatus comprises a plurality of solenoids, spirally arranged, whose iron cores intersect and extend beyond the points of intersection, and a plurality of electrical coils supplied with polyphase currents, said coils being spirally displaced in position from each other around said spiral iron cores by a position angle equal to the phase-angle of the polyphase currents employed.

Also in general terms, the method consists in providing a plurality of spirally arranged electrical circuits excited by polyphase electromotive forces displaced in time-phase from each other by a phase-angle equal to the position angle of the coils of the circuits.

The spiral movement of the magnetic poles, produced by winding the iron cores, C C and C' C', with four-phase windings and supplying these windings with four-phase currents, is indicated by the arrows in Figures 4, 7 and 8. By this arrangement I produce a spirally revolving magnetic field, by means of which the electrons are converted into electromagnetons and Z-rays are generated, and electric currents are produced by induction in my wireless-and-metallic circuits. The poles of this magnetic field shift spirally around the secondary metallic conductors and around the beam of Z-ray wireless conductors, and thereby induce currents in these conductors and in the wireless-and-metallic circuits, between the transmitting and utilizing apparatus.

The result of this arrangement is to produce a spirally moving stream of magnetism, which is analogous to the rotating stream or state of magnetism of the induction motor, with the important difference that my spirally moving stream of magnetism is projected out into space through the ends of the solenoids, S S and S' S'.

My transmitter-generator may be likened to an electro-magnetic pump, in that it drives or pumps streams of electromagnetic energy around the circuits. Streams of electrons are driven along the lines of my metallic and wireless conductors, by the X-ray type and ultra violet ray type of apparatus, and streams of electromagnetons are driven or pumped through the circuit or system of circuits by the Z-ray type of apparatus.

The wireless-and-metallic circuit may be likened to an electromagnetic pipe-line in that it affords a narrow and confined channel for the flow of electromagnetic energy, and prevents the energy from spreading out over a wide expanse. This pipe-line is porous in the sense that free electrons and electrons which are dislodged from their mother atoms and energized by the beam of rays and by the other means and devices disclosed herein, are driven from one part of the pipe-line into another part of the pipe-line and are all urged to flow through the wireless-and-metallic circuit. The quantity of energy flowing in the circuit is thus increased at various points, by the agency of some kind of distributed electromagnetic motive force.

Fig. 6ª illustrates a method of heating the cathodes K and K' electrically by polyphase currents, which are induced in the secondary conductors by a moving magnetic field, preferably by a spirally revolving magnetic field. In Fig. 6ª each cathode consists of two tungsten wires which cross each other at the focus of the reflector R, but are not in metallic contact with each other. Each of the four tungsten wires of the two cathodes is placed in circuit with one of the copper conductors of the secondary. With four of said copper conductors displaced by ninety degrees and carrying four-phase currents, the two cathodes may be heated to incandescence, and will liberate and discharge a copious supply of electrons. The cathodes may be heated, however, in any suitable manner. In Fig. 1 the cathode K is heated by conduction current from a generator.

The sources of electrons may consist of any metal which can be heated to a high temperature without melting, such as tungsten, or tantalum, and the like.

Many of the existing types of electrical machines, such as motors and electric lamps, can be operated by the energy transmitted by my methods of wireless transmission of energy. The electromagnetic energy transmitted by my stream method can also be converted into mechanical energy by means of my spirally revolving-field motor and other forms of apparatus which are especially designed for utilizing my spirally revolving magnetic field, such as my re-transmitter-generator, illustrated in Fig. 12, to be later described.

Fig. 8 represents in diagram-form the primary for the closed spiral iron-core variety of transmitter-generator, with connections to my receiving antenna through the primary windings. The iron cores of the primary are spirally arranged on a hollow cylindrical frame N, as already described in the case of my solenoid transmitter-generator, except that their ends do not project, but are welded together so as to make a continuous iron circuit with small magnetic leakage, in place of the large magnetic leakage at the ends of the solenoids in the solenoid variety of apparatus. In the dynamo variety of transmitting and re-transmitting apparatus, relative motion between the primary and secondary members is permitted, and either member (or both members) may be driven by mechanical power or energy. The dynamo converts this mechanical energy nearly quantitatively into electromagnetic energy. The apparatus has a large and variable reactance. Self-excitation of the dynamo variety of my transmitter-generator and re-transmitter-generator by armature reaction at speed can be explained by the fact that the counter electromotive force of self-induction is not wattless or in quadrature with the current, but contains an energy component of reactance, as in the case of the reaction generator. Negative power components of reactance exist in my wireless-and-metallic circuit, as in the case of a metallic oscillating-current circuit. The inductive reactance, as well as the condensive reactance, do not represent wattless electromotive forces, but introduce power components of negative sign into the circuit.

Figure 9:
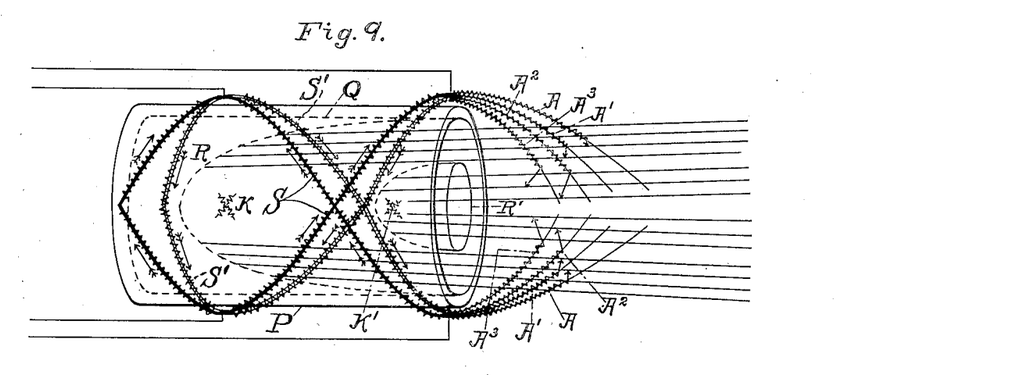
Fig. 9 is a diagrammatical view of a transmitter-generator of the transformer variety; for use in practicing the Z-ray method of wireless transmission of energy.

Fig. 9 represents the transformer type of my transmitter-generator in action, sending out two pairs of wireless conductors. S S and S' S' are two solenoids wound in spirals around a cylindrical framework P, and intersecting each other at right angles. The solenoids afford four primary coils arranged as in my dynamo type of apparatus, shown in Fig. 4; and these four coils are supplied with four-phase currents, whereby a spirally revolving magnetic field is produced. There are also four secondary coils wound upon the two solenoids, marked A, $A^1$, $A^2$, and $A^3$, whose ends constitute my transmitting antennæ and connect with the wireless conductors as shown. R is a large parabolic reflector, with a hot cathode, K, located at its focus; and R' is a small parabolic reflector, with another hot cathode K', located at its focus. These hot cathodes are the sources of electrons, most of which are discharged against the walls of the reflectors and generate or originate Z-rays.

Figure 10:
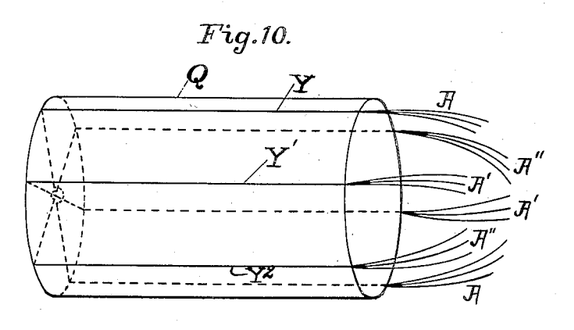
Fig. 10 is a diagrammatical view of a secondary member of a transmitter-generator of the three-phase type.

Fig. 10 is a diagrammatic representation of the secondary for a three-phase system, consisting of three copper loops Y, $Y^1$, $Y^2$, extending longitudinally around a cylindrical framework Q, with their ends projecting beyond the cylinder, and constituting the transmitting antennæ, marked respectively A A, A' A', and $A^2$ $A^2$. These loops are equally displaced from one another, and are insulated from each other.

Figure 11:
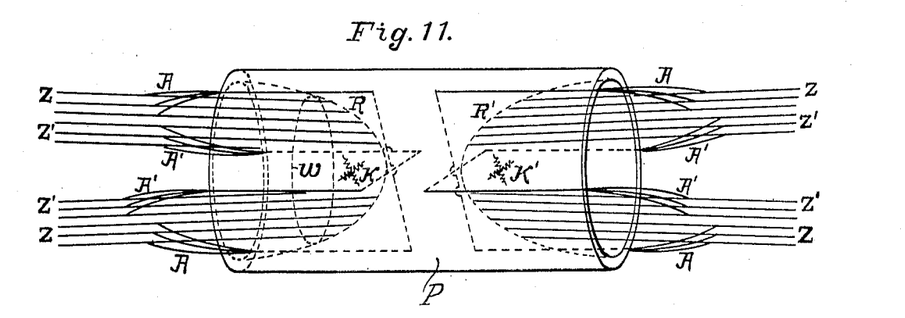
Fig. 11 is a diagrammatical view of the secondary of a "double barreled" transmitter generator for producing two beams of Z-ray wireless conductors and two streams of energy in opposite directions.

Fig. 11 represents a double-barrelled secondary, projecting two beams of Z-ray wireless conductors in opposite directions. There are two reflectors, R and R', facing in opposite directions, and there are two sets of antennæ, A A and A' A'. K and K' are sources of electrons, heated by electric current.

Fig. 12 shows my re-transmitted-generator of the solenoid variety, with the primary windings connected with the four pairs of segments of a receiving antenna for four-phase currents. The four pairs of segments of the receiving antenna connect with the four phases of the alternating current carried by the Z-ray wireless conductors. By means of this apparatus, which is like my transmitter-generator, streams of energy can be transmitted either in the same direction as that of the original stream of energy or in any other direction. Long-distance wireless transmission of energy in large quantities thus becomes feasible by the aid of my invention.

My stream of energy consists of two chief kinds or varieties of stream, which may be described as, first, the electric stream, composed of electrons (or electricity) flowing along my beam or cable of X-ray wireless conductors; and, second, the electromagnetic stream, composed of electromagnetons flowing along my beam or cable of Z-ray wireless conductors.

Moving electrons are known to be endowed with kinetic energy, and to possess "mass." The kinetic energy of my stream of electrons, or electric stream, is therefore equal to the product of half the mass of the electrons into the square of the velocity; or, in symbols, $$W = \tfrac{1}{2} m v^2,$$

where W is the kinetic energy, $m$ is the mass, and $v$ is the velocity.

The kinetic energy of my electromagnetic stream is greater than that of the electric stream, it seems, though I am unable to say how much greater it is. Moving magnetic poles and moving polarizations of space possess velocity ($v$), and they act as if they also possessed mass ($m$), and momentum or inertia; for instance, in the polyphase induction motor where the rotor is set in motion by, and revolves in the same direction as, the rotating magnetic poles. The same conclusion may be reached, however, namely, that my electromagnetic stream possesses greater kinetic energy than my electric stream, by saying that a larger number of electrons are driven or pumped into my circuits and set in stream-like motion by my distributed electromotive forces and my spirally revolving magnetic field than by concentrated electromotive forces, without a spirally revolving magnetic field.

The kinetic energy developed by my apparatus is considerable even when both the primary and secondary members are fixed in position and without relative motion. In the dynamo variety of my transmitter-generator, where relative motion between these two members is permitted, the kinetic energy developed may be increased by driving the secondary member of the transmitter-generator in the opposite direction to that of the revolving magnetic field, or by driving the primary member in the same direction as that of the revolving magnetic field. The kinetic energy developed may be still further increased by driving both members in these respective directions at the same time.

The frequency of the apparatus is also increased by driving one member or both members in the directions stated immediately above in this specification.

What I claim is:—

1. A system for transmitting energy without wires comprising a source of electric current, a pair of symmetrically disposed parabolic conductors connected to said source of electric current, utilizing apparatus at a distance therefrom, a pair of symmetrically disposed segmented conductors connected to said utilizing apparatus, a pair of ultra X-ray wireless conductors extending the whole distance between said pairs of spaced conductors, and means for electrically connecting said pair of wireless conductors to said pair of parabolic conductors at one end of the circuit and to said pair of segmented conductors at the other end of the circuit.

2. The method of closing an otherwise open electric circuit between spaced metallic conductors consisting in electrically connecting said spaced metallic conductors by an ultra X-ray wireless conductor extending the whole distance between said spaced metallic conductors.

3. A system for generating and transmitting energy comprising a closed wireless-metallic electric current, means for producing a spirally revolving magnetic field, and means for applying said magnetic field across said electric circuit.

4. A system for transmitting energy comprising a polyphase alternator, a spiral-core transforming apparatus whose primary member is connected to said alternator and is adapted for producing a spirally revolving magnetic field, a secondary member in inductive relation to said spirally revolving magnetic field, receiving-utilizing apparatus at a distance therefrom adapted for receiving and utilizing alternating currents, means for producing a plurality of ultra X-ray wireless conductors, one pair for each phase of alternating current, and means for electrically connecting said wireless conductors to said secondary member at one end of the circuit and to said receiving-utilizing apparatus at the other end of the circuit.

5. Means for producing an ultra X-ray wireless conductor comprising a parabolic reflecting surface adapted for converting a stream of impinging electrons into a beam of X-rays, an incandescent filamentary spiral coil at the focus of said parabolic reflecting surface adapted for discharging a stream of electrons against said surface, a partially air-exhausted chamber enclosing said coil and said stream of electrons, means for producing a spirally revolving magnetic field, and means for superimposing said magnetic field in such manner that the magnetic flux will pass through said parabolic reflecting surface and will be substantially parallel to the direction of said stream of electrons.

6. The method of producing a beam of ultra X-rays consisting in discharging a stream of electrons from the focus of a parabolic reflecting surface against said surface, and in exposing said stream of electrons to the action of a spirally revolving magnetic field in such manner that the magnetic flux will be substantially parallel to the direction of said stream of electrons and will pass through said parabolic reflecting surface.

7. The method of producing the wireless element of a wireless-metallic circuit which consists in discharging a stream of electrons from the focus of a parabolic reflecting surface against said surface in a partial vacuum, and in exposing said electron stream to the action of a spirally revolving magnetic field in such manner that the magnetic flux will be substantially parallel to the direction of said electron stream and will pass through said parabolic reflecting surface.

8. Means for producing a beam of ultra X-rays comprising a parabolic reflecting surface adapted for converting a stream of impinging electrons into a beam of X-rays, a source of electrons at the focus of said surface adapted for discharging a stream of electrons toward said surface, a partially air-exhausted chamber enclosing said source and said stream, means for producing a spirally revolving magnetic field, and means for superimposing said magnetic field thereon in such manner that its flux will pass through said surface and will be substantially parallel to the direction of said stream of electrons.

9. Means for producing a pair of ultra X-ray wireless conductors comprising a pair of parabolic reflecting surfaces having a common focus and adapted for converting a pair of electron streams impinging thereon into a pair of X-ray beams, a source or sources of electrons located at said focus adapted for discharging a pair of electron streams toward said pair of reflecting surfaces, and means for focusing and concentrating each and every electron stream into an intense and confined stream of electrons comprising a spirally revolving magnetic field which is applied in such manner that its flux will be substantially parallel to the direction of each and every electron stream and will pass through each and every parabolic reflecting surface.

10. The method of generating and transmitting electric current consisting in exposing a closed wireless-metallic circuit or system of such circuits to the action of a spirally revolving magnetic field.

11. Means for producing the wireless element of a system of closed wireless-metallic circuits comprising a plurality of parabolic reflectors, a source of electrons at the focus of each reflector adapted for discharging at least one definite stream of electrons against at least one definite segment of each reflector, a sealed chamber enclosing each source of electrons and each stream of electrons, and means for focusing and concentrating each electron stream upon a segment of the suitable parabolic reflector comprising a spirally revolving magnetic field whose flux is substantially parallel to the direction of each and every electron stream and passes through each and every parabolic reflecting segment.

12. Means for producing the wireless element of a system of closed wireless-metallic circuits comprising, for each pair of wireless conductors desired, a pair of parabolic reflecting surfaces having a common focus, an electron-discharging material located at said focus, means for producing a spirally revolving magnetic field, and means for superimposing said magnetic field thereon in such manner that the magnetic flux will pass through each and every pair of parabolic reflecting surfaces and through the major portion of the electron discharge at less than a right angle.

13. The method of transmitting alternating current through a closed and confined wireless-metallic circuit, or system of such circuits, which consists in the displacement of separate and distinct wireless conductors in space by a position angle equal to the phase angle of the current supplied.

14. In the wireless transmission of alternating current means for producing a system of confined wireless conductors comprising, for each phase of alternating current, a pair of parabolic reflecting surfaces having a common focus and adapted for producing a pair of X-ray beams, a source of electrons at the focus of each reflecting surface adapted for discharging a definite stream of electrons toward each particular reflecting surface, and means for displacing the different streams of electrons from one another by a position angle equal to the phase-angle of the alternating current supplied.

15. In combination a plurality of relatively insulated parabolic conducting segments, symmetrically spaced, a receiving antenna at a distance therefrom consisting of an equal number of relatively insulated conducting segments, likewise spaced, means for producing a plurality of confined X-ray wireless conductors, means for connecting said wireless conductors and the suitable segments into a closed and confined wireless-metallic circuit or system of such circuits, and means for producing and applying a spirally revolving magnetic field.

16. In a system for transmitting electric energy through closed and confined wireless-and-metallic circuits, the method of endowing electrons with motion along the conductors of said circuits which consists in exposing each circuit to the action of a spirally revolving magnetic field.

17. In combination a transmitting-generating apparatus, a receiving-utilizing apparatus at a distance therefrom, means for establishing a closed and confined-path wireless-and-metallic electrical circuit or system of such circuits connecting said apparatuses, means for generating electromotive forces distributed over two dimensions of space, and means for applying said distributed voltage across each circuit.

18. In combination a transmitting-generating apparatus, a receiving-utilizing apparatus at a distance therefrom, means for establishing a closed and confined wireless-and-metallic electrical circuit or system of such circuits connecting said apparatuses, means for generating electromotive forces distributed over three dimensions of space, and means for applying said distributed electromotive forces across each and every circuit.

19. Means for generating electromotive forces distributed over three dimensions of space comprising means for producing a spirally revolving magnetic field.

20. Means for producing a spirally revolving magnetic field comprising a spiral-core apparatus provided with circuit-coils supplied with polyphase alternating currents, said coils being displaced upon said core by a position angle equal to the phase-angle of said currents.

21. In combination a spiral-core transmitting-generating apparatus provided with metallic primary and secondary circuits adapted for the production of a spirally revolving magnetic field and for generating electromotive forces in its metallic secondary conductors, a metallic receiving antenna at a distance therefrom adapted for receiving alternating current transmitted to it through a system of confined wireless conductors, and means for producing a system of confined wireless conductors extending the whole distance between and electrically connected both to the metallic secondary conductors of said transmitting-generating apparatus and to the metallic conductors of said receiving antenna at symmetrically spaced points.

22. A system of closed wireless-and-metallic electrical circuits for transmitting alternating current comprising two sets of metallic conductors at opposite ends of each circuit which are displaced from each other by a position angle equal to the phase angle of the impressed alternating electromotive force, and two sets of confined wireless conductors on opposite sides of each circuit which are likewise displaced from each other, and means for electrically connecting said metallic conductors and said wireless conductors to each other so as to establish a closed and confined-path wireless-and-metallic electrical circuit for each and every phase of electromotive force impressed upon said system.

23. In combination a source of current, a pair of metallic transmitting antennæ connected to said source of current, a pair of metallic receiving antennæ at a distance therefrom connected to the metallic conductors of a selected utilizing apparatus, and means for producing a pair of separate wireless conducting sections extending lengthwise, so located as to make electrical connection with both pairs of said metallic transmitting and receiving antennæ.

24. In combination an alternator, a pair of metallic transmitting antennæ connected to said alternator, a pair of metallic receiving antennæ at a distance therefrom connected to the metallic conductors of a selected utilizing apparatus and a pair of distinct ultra X-ray wireless conductors so located as to make electrical connection with said apparatuses.

25. In combination two parabolic reflectors opening in opposite directions having coinciding major axes, an electron-discharging cathode at the focus of each reflector adapted to the discharge of streams of electrons against predetermined segments of each reflector, and means for producing a spirally revolving magnetic field transversely to the major axes of said reflectors.

26. In combination a plurality of parabolic reflectors, an electron-discharging substance at the focus of each reflector adapted for the discharge of at least one stream of electrons, and means for producing a spirally revolving magnetic field transversely to the major axes of said reflectors.

27. In combination spaced metallic conductors, two parabolic reflectors having an electron-discharging substance at the focus of each reflector, means for the production of two beams of wireless conductors extending the entire distance between said metallic conductors, means for electrically connecting said beams to said metallic conductors and for establishing a closed and confined-path wireless-and-metallic circuit, or system of such circuit, between said metallic conductors, means for producing a spirally revolving magnetic field and for superposing said field upon the aforesaid in such manner that the magnetic lines of said field will cut the conductors of each circuit in the course of revolution.

28. A system for generating and transmitting polyphase alternating currents comprising means for establishing at least two closed and confined wireless-and-metallic electrical circuits arranged in quadrature position, means for producing a spirally revolving magnetic field, means for superposing said magnetic field upon said circuits in such manner that the revolving magnetic lines of the field will cut the conductors of each circuit, and means for increasing the rate of cutting between said magnetic lines and said conductors.

29. A closed wireless-and-metallic electrical circuit comprising a transmitting-generating apparatus, a receiving-utilizing apparatus at a distance therefrom, an X-ray wireless conductor extending the entire distance between and electrically connecting half of the metallic terminal conductors of each of said apparatuses, and means for electrically connecting the other half of the metallic terminal conductors of each of said apparatuses to a conducting medium other than said wireless conductor.

30. A system for transmitting alternating-current energy consisting of a system of wireless-and-metallic circuits comprising two sets of wireless conductors on opposite sides of each circuit, and of two sets of metallic conductors at opposite ends of each circuit, for each and every phase of alternating current supplied to the system, which wireless conductors and metallic conductors are so located with respect to each other as to make electrical connection, and to form a wireless-and-metallic circuit for each and every phase of alternating current supplied to the system.

31. In combination a pair of metallic transmitting antennæ, a pair of metallic receiving antennæ at a distance therefrom, means for producing a wireless element divided into a pair of conducting sections on opposite sides of said wireless element, and means for so locating said conducting sections as to make electrical connection with both pairs of said metallic antennæ.

32. In combination symmetrically spaced metallic transmitting antennæ adapted for making electrical connection with symmetrically spaced conducting sections in a wireless element, symmetrically spaced metallic receiving antennæ at a distance therefrom likewise adapted for making electrical connection with said conducting sections, means for producing a wireless element divided into symmetrically spaced conducting sections, and means for so locating said conducting sections as to make electrical connection with said metallic transmitting and receiving antennæ.

33. In combination a source of electric current, a pair of metallic transmitting antennæ connected thereto, a non-conducting parabolic reflector furnished with a pair of electrical conducting segments, means for producing a pair of confined wireless conductors and for connecting them to said pair of metallic conducting segments at the transmitting end of the circuit, a receiving-utilizing apparatus at a distance therefrom, and means for electrically connecting thereto the same pair of confined wireless conductors.

34. Wireless-and-metallic circuits for connecting an alternating-current transmitter-generator with utilizing apparatus, comprising, for each phase of alternating current, a pair of metallic transmitting antennæ, and for each phase of alternating current, a pair of metallic receiving antennæ, and for each phase of alternating current, a pair of wireless conductors connecting said transmitting and receiving antennæ, and for each phase of alternating current, a pair of metallic conductors or windings of the utilizing apparatus designed for use with that particular phase of alternating current and connected to a pair of said receiving antennæ, thus forming a complete wireless-and-metallic circuit for each and every phase of alternating current.

35. A chain of wireless-metallic electric circuits comprising a plurality of such circuits linked together and electrically connected from beginning to end of the chain, each circuit being inductively connected to the adjacent circuit or circuits, so that electric current can be transmitted a long distance through a plurality of electric circuits from one part of the chain to another part thereof.

36. In the wireless transmission of energy by alternating current, for each and every phase of alternating current, a pair of metallic transmitting antennæ, consisting of two sets of copper wires, each pair of transmitting antennæ connecting with a pair of wireless conductors extending to and connecting with a pair of metallic conductors of the receiving antennæ, which latter are connected to the pair of metallic conductors of the utilizing apparatus designed for use with that particular phase of alternating current.

37. A receiving antenna divided into one pair of relatively insulated segments for each and every phase of alternating current supplied to the system, consisting of a circular frame-work having conducting segments extending from near the center to the circumference, the base of the circular frame-work being insulated from the ground, and the whole apparatus adapted to be placed in operative relation with a system of wireless-and-metallic circuits so that each pair of segments will receive a particular phase of current and conduct that phase of current to the particular circuit in the utilizing apparatus designed to receive said phase of current and to convert it into useful work.

38. In the wireless transmission of current, receiving antenna divided into a pair of relatively insulated segments, one segment being located across a beam of wireless conductors in such a manner as to receive the outgoing current and the other segment being so placed across the beam of wireless conductors as to receive the incoming current, flowing through a pair of said wireless conductors or flowing through a plurality of pairs of said wireless conductors.

39. A receiving antenna comprising a structure with metallic spokes and pendants, or cross-pieces, divided into one pair of relatively insulated segments, the structure being mounted so as to permit it to turn on its short axis or axle, in operative relation with a system of wireless-and-metallic circuits carrying current, said receiving antenna being insulated from the earth.

40. Apparatus for receiving alternating energy transmitted by wireless conductors comprising a structure the surface of which is divided into relatively insulated segments containing metallic conductors, with one pair of segments for each and every phase of alternating energy flowing through said receiving apparatus, located in operative relation with a system of wireless-and-metallic circuits carrying current, said receiving apparatus being insulated from the earth.

41. Apparatus for receiving and utilizing energy transmitted by wireless means comprising a hollow structure the surface of which is divided into a suitable number of metallic segments insulated from each other and from the earth located in operative relation with a system of wireless-and-metallic circuits carrying current, and a solid structure located within said hollow structure with an air-space between the two members, which are so mounted as to permit relative motion between the members, said outer member corresponding to the primary of an induction motor, and said inner member corresponding to the secondary of an induction motor.

42. In combination symmetrically spaced metallic transmitting antennæ, means for connecting opposite antennæ into a closed and confined wireless-and-metallic circuit or system of such circuits, means for producing a spirally revolving magnetic field, and means for applying said field across each circuit.

43. In combination a segmented wireless receiving antenna, means for connecting opposite segments of said receiving antenna into a closed and confined wireless-and-metallic circuit or system of such circuits, means for producing a spirally revolving magnetic field, and means for applying said field across each circuit.

44. The method of relaying energy without wires which consists in spirally twisting magnetic lines of energy around the wireless conductors of a closed and confined wireless-and-metallic electrical circuit, or system of such circuits, in such manner that said magnetic lines will cut said wireless conductors in the process of twisting.

45. The method of relaying energy which consists in spirally twisting closed streams of polyphase magnetic energy around the wireless conductors of a closed and confined-path wireless-and-metallic electrical circuit, or system of such circuits, in such manner that said streams will cut said wireless conductors at a distance from the sources of said streams.

46. The combination with a wireless receiving apparatus of a wireless-and-metallic circuit connecting the receiving station with a transmitting station, and containing a source of distributed electromotive force, namely a spirally revolving magnetic field applied across said wireless-and-metallic circuit.

47. In combination, a spiral iron-core, metallic primary windings for said spiral iron-core which are connected with an alternator, metallic secondary conductors in inductive relation to said primary windings, utilizing apparatus at a distance therefrom, and wireless conductors which are so located as to make electrical connection with said utilizing apparatus and with said metallic secondary conductors, thus forming a complete wireless-and-metallic circuit, or system of circuits.

48. In combination, a spiral iron-core primary wound for polyphase current, adapted to producing a spirally revolving magnetic field, a secondary apparatus so mounted with reference to the primary apparatus as to permit relative motion between the two members, means for driving one member and producing a spirally revolving magnetic field, thus inducing electromotive force in the metallic secondary conductors, utilizing apparatus at a distance therefrom, and wireless conductors which are so located as to make electrical connection with said utilizing apparatus and with said metallic secondary conductors, thus forming a complete wireless-and-metallic circuit or system of circuits.

49. In combination a wireless element divided into a pair of wireless conducting sections extending lengthwise, a pair of metallic transmitting antennæ and means for electrically connecting them to said pair of wireless conducting sections, a pair of metallic receiving antennæ at a distance from said metallic transmitting antennæ, and means for electrically connecting said receiving antennæ to the same pair of wireless conducting sections.

50. In combination with a wireless element divided into a system of wireless conducting sections extending lengthwise, a pair of metallic transmitting antennæ for each and every pair of wireless conducting sections and means for electrically connecting the same, a pair of metallic receiving antennæ at a distance therefrom for each and every pair of wireless conducting sections and means for electrically connecting each pair of metallic receiving antennæ to the corresponding pair of wireless conducting sections.

51. Apparatus for relaying and re-transmitting energy comprising a plurality of spirally arranged iron cores wound with primary coils for polyphase currents which coils are spirally displaced around said iron cores by a position angle equal to the phase-angle of the polyphase currents, the ends of the iron cores projecting beyond the primary coils, and the terminals of the primary coils being connected to the receiving apparatus at the relaying station, and comprising metallic secondary conductors in inductive relation to said primary circuits, and a system of wireless conductors extending from the relay to the next receiving station, the terminals of said metallic secondary conductors projecting into the space occupied by said system of wireless conductors and intercepting said wireless conductors, thus forming wireless-and-metallic circuits between the relay and the next receiving station.

52. Means for relaying and re-transmitting energy comprising means for establishing a system of closed and confined wireless-and-metallic electrical circuits connecting the relaying station with the next receiving station, means for producing a spirally revolving magnetic field, and means for applying said field across each and every electrical circuit.

53. In the wireless transmission of alternating-current energy, a metallic receiving antennæ insulated from the earth, comprising for each and every phase of electromotive force, a pair of conducting members diametrically opposite each other and insulated from each other and from every other member, adapted to gather alternating-current energy and connected into a system of wireless-and-metallic circuits in such manner as to afford a wireless-and-metallic circuit for each and every phase of electromotive force applied across the system.

54. The method of producing a spirally revolving magnetic field which consists in supplying polyphase currents to winding coils which are displaced upon a spiral cone by a position angle equal to the phase angle of the currents supplied.

CONRAD RENO.

Certificate of Correction.

It is hereby certified that in Letters Patent No. 1,504,974, granted August 12, 1924, upon the application of Conrad Reno, of Springfield, Massachusetts, for an improvement in "Systems for Transmitting Energy without Wires," errors appear in the printed specification requiring correction as follows: Page 5, line 91, for the misspelled word "ars" read *are;* page 6, line 11, for the word "of" read *or;* page 7, line 97, for the word "re-transmitted" read *re-transmitter;* page 8, line 73, claim 3, for the word "current" read *circuit;* page 10, line 98, claim 27, for "circuit" read *circuits;* and page 13, line 36, claim 54, for "cone" read *core;* and that the said Letters Patent should be read with these corrections therein that the same may conform to the record of the case in the Patent Office.

Signed and sealed this 14th day of October, A. D. 1924.

[SEAL.]
KARL FENNING,
*Acting Commissioner of Patents.*